US007678987B2

(12) United States Patent
Lye

(10) Patent No.: US 7,678,987 B2
(45) Date of Patent: Mar. 16, 2010

(54) APPARATUS AND METHOD FOR VIBRATING STRINGED MUSICAL INSTRUMENTS

(75) Inventor: Agapitus B. Lye, Gainesville, FL (US)

(73) Assignee: ToneRite, Inc., Gainesville, FL (US)

( * ) Notice: Subject to any disclaimer, the term of this patent is extended or adjusted under 35 U.S.C. 154(b) by 5 days.

(21) Appl. No.: 12/063,553

(22) PCT Filed: Aug. 10, 2006

(86) PCT No.: PCT/US2006/031107

§ 371 (c)(1),
(2), (4) Date: Feb. 11, 2008

(87) PCT Pub. No.: WO2007/021784

PCT Pub. Date: Feb. 22, 2007

(65) Prior Publication Data

US 2008/0190260 A1 Aug. 14, 2008

Related U.S. Application Data

(60) Provisional application No. 60/779,875, filed on Mar. 6, 2006, provisional application No. 60/707,460, filed on Aug. 11, 2005.

(51) Int. Cl.
*G10H 3/00* (2006.01)
*G01D 3/02* (2006.01)

(52) U.S. Cl. .......................................... 84/723; 84/294

(58) Field of Classification Search ............... 84/297 R, 84/294, 453, 723

See application file for complete search history.

(56) References Cited

U.S. PATENT DOCUMENTS

| | | | |
|---|---|---|---|
| 5,031,501 A | 7/1991 | Ashworth | |
| 5,537,908 A * | 7/1996 | Rabe et al. | 84/454 |
| 7,227,068 B1 * | 6/2007 | Van Doren | 84/297 R |

FOREIGN PATENT DOCUMENTS

| | | |
|---|---|---|
| DE | 551 820 | 6/1932 |
| DE | 44 15 816 | 11/1995 |
| FR | 2 501 885 | 9/1982 |

OTHER PUBLICATIONS

Supplementary European Search Report dated Oct. 13, 2008, pp. 1-3.

* cited by examiner

*Primary Examiner*—Jeffrey Donels
(74) *Attorney, Agent, or Firm*—Allen, Dyer, Doppelt, Milbrath & Gilchrist, P.A.

(57) ABSTRACT

This invention provides apparatus and methods for seasoning stringed musical instruments. For stringed instruments having a bridge, the apparatus comprises an electric vibration generator attached to a bridge cradle, the bridge cradle being sized and configured for detachable attachment to a bridge of the instrument, the bridge cradle comprising a main body portion sized and configured to be placed upon the bridge in sufficient contact therewith to permit the transfer of vibration generated by the vibration generator into the bridge of the instrument. For stringed instruments having a sound hole, the apparatus comprises an electric vibration generator attached to a vibration cradle, the vibration cradle being sized and configured for detachable attachment between the body and strings of the instrument, the vibration cradle comprising a base sized and configured to be placed in sufficient contact with the sound hole to permit the transfer of vibration generated by the vibration generator into the body of the instrument.

23 Claims, 2 Drawing Sheets

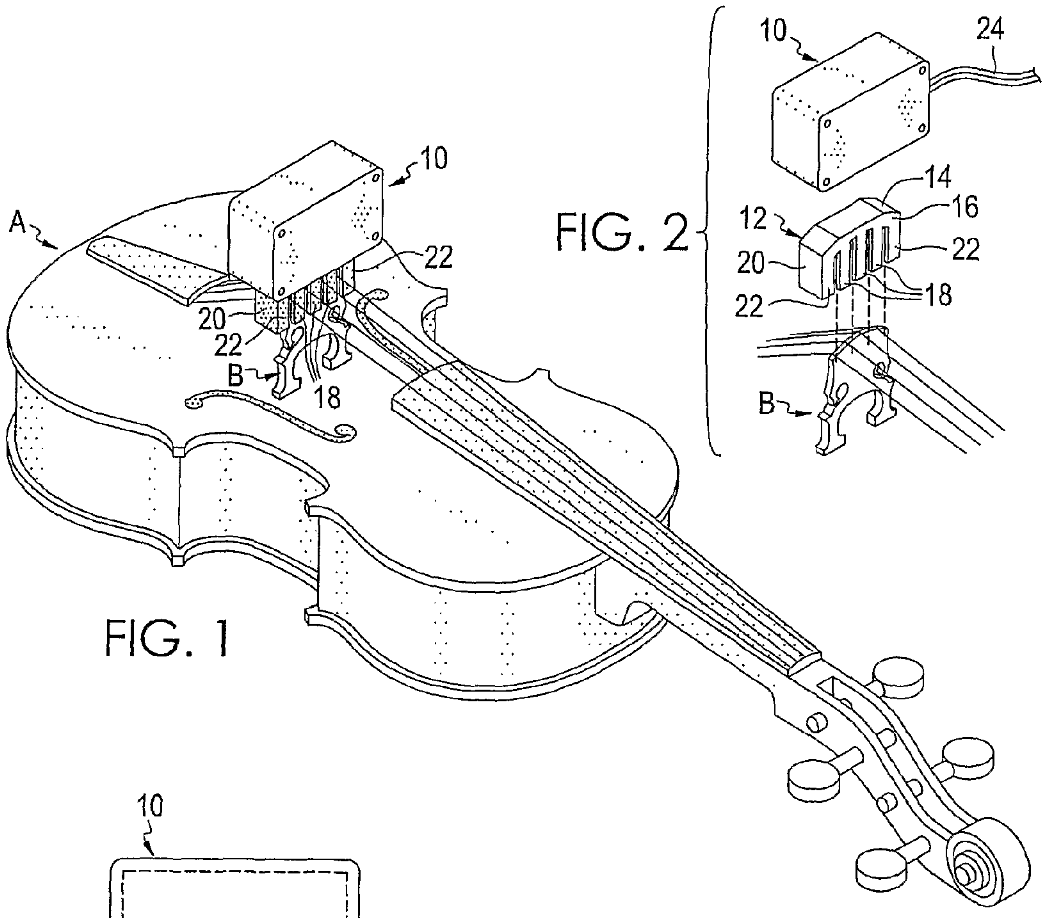
FIG. 1
FIG. 2
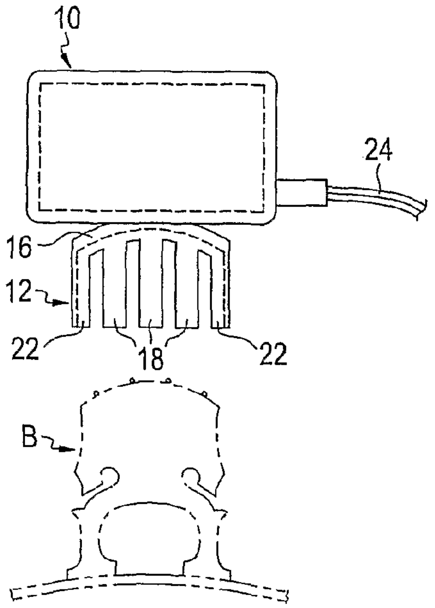
FIG. 3
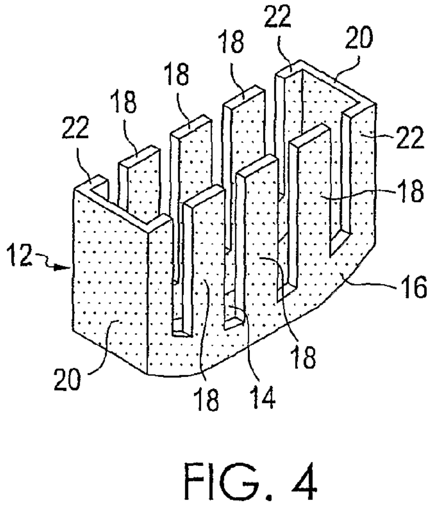
FIG. 4

APPARATUS AND METHOD FOR VIBRATING STRINGED MUSICAL INSTRUMENTS

REFERENCE TO RELATED APPLICATIONS

This application is the National Stage of International Patent Application PCT/US2006/031107, filed on Aug. 10, 2006, which application claims priority from U.S. Applications No. 60/707,460, filed Aug. 11, 2005, and No. 60/779,875, filed Mar. 6, 2006, the disclosures of which are incorporated herein by reference.

TECHNICAL FIELD

This invention relates to stringed musical instruments, more particularly to devices and methods for improving the sound quality of stringed musical instruments.

BACKGROUND

It is known that certain stringed musical instruments play their best after a certain "play in" period following instrument fabrication. Examples of such musical instruments include wood-bodied instruments having a bridge such as the violin, viola, and cello, and wood-bodied instruments having a sound hole such as guitars, bass guitars, mandolins, and tanbours. Many believe that these types of musical instruments need to be played daily to sound their best. Because a "played in" instrument is preferable over one that is not, and because the time necessary to achieve sufficient "play in" can be substantial, a way of simulating the "playing in" of such instruments is needed. A way of automating instrument "play in" in fewer man hours is also needed.

SUMMARY OF THE INVENTION

The present invention meets the needs of those who play and deal with stringed musical instruments, and more specifically wood-bodied stringed musical instruments, by providing an apparatus and method for simulating the "play in" period of a musical instrument in a way that keeps the musical instrument in good performing condition. Advantageously, this can be accomplished without disturbing the strings of the instrument. When used appropriately, this invention reduces or eliminates the need for "playing in" a stringed musical instrument. This is accomplished by simulating the vibration that occurs during the "play in" period. This "playing in" and simulation of "playing in" the stringed musical instrument will be collectively referred to herein as "seasoning" the instrument.

One embodiment of the invention is an apparatus comprising an electric vibration generator attached to a bridge cradle, the bridge cradle being sized and configured for detachable attachment to a bridge of a stringed musical instrument, the bridge cradle comprising a main body portion sized and configured to be placed upon the bridge in sufficient contact therewith to permit the transfer of vibration generated by the vibration generator into the bridge of the instrument. Thus, the apparatus and method of this invention are capable of producing a vibration in the stringed musical instrument via the bridge of the instrument to season the instrument.

In another embodiment, this invention provides a method for seasoning a stringed musical instrument having a bridge. The method comprises i) attaching to the bridge of the instrument a vibration generating device, which device comprises an electric vibration generator attached to a bridge cradle, the bridge cradle being sized and configured for detachable attachment to a bridge of a stringed musical instrument, the bridge cradle comprising a main body portion sized and configured to be placed upon the bridge in sufficient contact therewith to permit the transfer of vibration generated by the vibration generator into the bridge of the instrument, and ii) actuating the vibration generating device so as to generate vibrations within the instrument.

Another embodiment of the invention is an apparatus comprising an electric vibration generator attached to a vibration cradle, the vibration cradle being sized and configured for detachable attachment between the body and strings of a stringed musical instrument having a sound hole, the vibration cradle comprising a base sized and configured to be placed in sufficient contact with the sound hole to permit the transfer of vibration generated by the vibration generator into the body of the instrument. Thus, the apparatus and method of this invention are capable of producing a vibration in the stringed musical instrument to season the instrument.

In still another embodiment, this invention provides a method for seasoning a stringed musical instrument having a sound hole. The method comprises i) placing over at least a portion of a sound hole of the instrument a vibration generating device, which device comprises an electric vibration generator attached to a vibration cradle, the vibration cradle being sized and configured for detachable attachment between the body and strings of a stringed musical instrument having a sound hole, the vibration cradle comprising a base sized and configured to be placed in sufficient contact with the sound hole to permit the transfer of vibration generated by the vibration generator into the instrument, and ii) actuating the vibration generating device so as to generate vibrations within the instrument.

These and other embodiments, advantages, and features of this invention will be apparent from the following description, accompanying drawings, and appended claims.

BRIEF DESCRIPTION OF THE DRAWINGS

FIG. 1 is a view of an apparatus of the invention attached to the bridge of a stringed musical instrument.

FIG. 2 is a view of an electric vibration generator and a bridge cradle which are not attached to each other for purposes of illustration.

FIG. 3 is a view of an apparatus of the invention shown above a bridge of a stringed instrument.

FIG. 4 is a view of a bridge cradle of an apparatus of the invention.

Like reference numbers, letters or symbols are used to refer to like parts or components amongst the several figures.

DETAILED DESCRIPTION OF THE INVENTION

Figure 5:
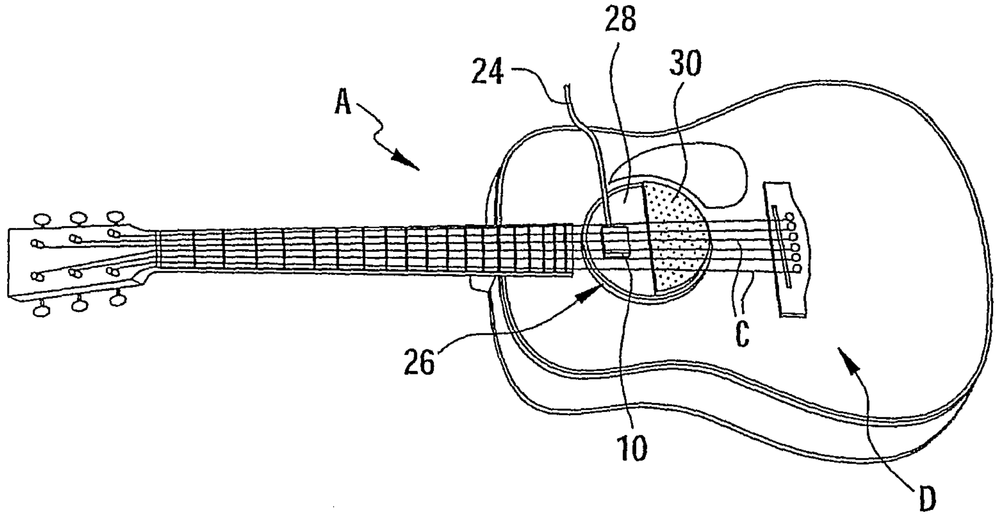
FIG. 5 is a view of an apparatus of the invention.

The apparatus and methods of this invention apply to stringed musical instruments, and more specifically wood-bodied stringed musical instruments having a bridge or having a sound hole. More particularly, the apparatus of this invention can be used with such stringed musical instruments that have a fundamental frequency range in the range of about 30 Hz to about 3500 Hz. The wood-bodied stringed musical instruments having a bridge to which this invention applies include, but are not limited to, violins, violas, cellos, and basses. The wood-bodied stringed musical instruments having a sound hole to which this invention applies include, but are not limited to, guitars, bass guitars, mandolins, and tanbours (tanburs).

The electric vibration generator can be configured to accept electric current from any of a variety of sources including a 60 Hz alternating current, batteries, and wall current. An external source of electric current is used in particular embodiments because batteries may not last long enough to provide the desired amount of seasoning, and for instruments having a bridge, larger batteries might cause the apparatus of the invention to be so heavy that the apparatus damages the musical instrument; for instruments having a sound hole, larger batteries may not fit in the limited amount of space between the strings and the body of the musical instrument. The power source can be, and in some embodiments is, connected to the electric vibration generator via one or more wires so that the power source is not in contact with the musical instrument. A power switch may be part of the electric vibration generator. An electric vibration generator with a power switch is preferred.

The vibrations in the electric vibration generator can be generated using any of a variety of mechanisms which are known in the art, including for example linear vibrators, rotary vibrators, and electromagnetic vibrators which employ an electromagnet coupled to a permanent magnet on an arm (in which the permanent magnet rotates as a result of the current that flows through the electromagnet, creating vibration), and the like. Any power source can be used, but in particular embodiments, electrical power, especially AC electrical current, is employed. In one particular embodiment, the vibration generator is an electromagnetic vibrator connectable to a source of AC electric current. In another particular embodiment, the vibration generator is an offset DC motor.

For a stringed musical instrument having a bridge, typically the bridge cradle is sized and configured for detachable attachment to a bridge of a stringed musical instrument. The bridge cradle includes a main body portion sized and configured to be placed upon the bridge in sufficient contact therewith to permit the transfer of vibration generated by the vibration generator into the bridge of the instrument. The bridge cradle is constructed from a material that can effectively transmit the vibrations from the vibration generator to the musical instrument. Rubber is a preferred material for the bridge cradle. The main body portion of the bridge cradle has one or more recesses that allow detachable attachment of the bridge cradle to the bridge of the musical instrument. Preferably, the main body portion of the bridge cradle is arched.

In a preferred embodiment, the bridge cradle also comprises two spaced-apart side walls extending from the main body portion, each of the side walls forming a plurality of spaced-apart, elongate flanges extending from the main body portion, the distance between each set of adjacent flanges being sufficient to accommodate a string of the instrument therein when the cradle is placed upon the bridge of the musical instrument. The distance between the two spaced-apart side walls is sufficient to receive at least a portion of the bridge therebetween. When the main body portion of the bridge cradle is arched, it is preferred that the flanges extend from the concave side of the arched main body portion. The flanges preferably have one or more of the following features: they are co-extensive; those in each side wall are equidistantly spaced; those extending from the same side wall are coplanar; those from opposite side walls are directly opposite each other. In some embodiments of this invention, the flanges have at least two of these characteristics; in others, the flanges have all of these characteristics. The bridge cradle in some embodiments may be characterized in that the main body portion is arched, the flanges extend from the concave side of the arched main body portion, the flanges are co-extensive, the flanges in each side wall are equidistantly spaced, the flanges in each side wall are equidistantly spaced, the flanges extending from the same side wall are coplanar, and the flanges from opposite side walls are directly opposite each other. In other embodiments, the bridge cradle further incorporates end members extending from the main body portion and perpendicular to the side walls, with each end member sealably connecting to a flange on each side wall. The electric vibration generator is attached (or attachable) to the main body portion of the bridge cradle. Normally, the vibration generator is attached to the bridge cradle opposite to the part of the main body portion that will contact the bridge of the stringed musical instrument. The bridge cradle and the electric vibration generator are attached such that vibrations are effectively transmitted from the vibration generator through the bridge cradle to the musical instrument. Preferably, when the main body portion of the bridge cradle is arched, the vibration generator is attached to the bridge cradle on the convex side of the arched main body portion.

The invention also provides a method for seasoning a wood-bodied stringed musical instrument having a bridge. As described above, the method comprises i) detachably attaching to the bridge of the instrument a vibration generating device, and ii) actuating the vibration generating device so as to generate vibrations within the instrument. The vibrations which are generated are transmitted through the bridge cradle to the musical instrument with an amplitude and frequency which is such that the vibrations simulate those vibrations normally produced when the instrument is played.

The device used in this method for instruments having a bridge may comprise an electric vibration generator attached to a bridge cradle, the bridge cradle being sized and configured for detachable attachment to a bridge of a stringed musical instrument, the bridge cradle comprising a main body portion sized and configured to be placed upon the bridge in sufficient contact therewith to permit the transfer of vibration generated by the vibration generator into the bridge of the instrument. In one embodiment, the bridge cradle of the device also comprises two spaced-apart side walls extending from the main body portion, each of the side walls forming a plurality of spaced-apart, elongate flanges extending from the main body portion, the distance between each set of adjacent flanges being sufficient to accommodate a string of the instrument therein when the cradle is placed upon the bridge of the musical instrument. Other preferred features of the device used in this method are as described above for the apparatus of the invention comprising a bridge cradle.

In a method of this invention, the main body portion of the bridge cradle attaches to the bridge by pinching the bridge. Non-recessed or less-recessed portions of the main body portion of the bridge cradle pinch the bridge of the instrument to detachably attach to the bridge. In preferred embodiments in which the bridge cradle has flanges, when the cradle is detachably attached to the bridge of the musical instrument, the flanges are in contact with the bridge of the musical instrument, and, more preferably, the flanges extend between the strings without touching the strings of the instrument.

For a stringed musical instrument having a sound hole, typically the vibration cradle is sized and configured for detachable attachment between the body and strings of the instrument. The vibration cradle comprises a base sized and configured to be placed in sufficient contact with the sound hole to permit the transfer of vibration generated by the vibration generator into the body of the instrument. The vibration cradle base is constructed from a material that can effectively transmit the vibrations from the vibration generator to the musical instrument. In particular embodiments, rubber is the material for the vibration cradle base.

The vibration cradle base is usually relatively flat, and the shape of the vibration cradle base can vary widely. In particular embodiments, conventional geometric shapes such as circles, ovals, squares, and rectangles are used. Contact with the strings of the instrument attaches the apparatus of the invention to the musical instrument. The contact with the strings can be provided in various ways, including via the shape of the vibration cradle (e.g., an upslope from the base that reaches the strings) or by an attachment to the vibration cradle, such as an appropriate thickness of reversibly compressible material (e.g., foam) or a spring-loaded plate. The electric vibration generator is attached (or attachable) to the vibration cradle. Normally, the vibration generator is attached to the vibration cradle opposite to the portion that will contact the strings of the stringed musical instrument. The vibration cradle and the electric vibration generator are attached such that vibrations are effectively transmitted from the vibration generator through the vibration cradle to the musical instrument.

The invention also provides a method for seasoning a wood-bodied stringed musical instrument having a sound hole. As described above, the method comprises i) detachably attaching to the instrument a vibration generating device, and ii) actuating the vibration generating device so as to generate vibrations within the instrument. The vibrations which are generated are transmitted through the vibration cradle to the musical instrument with an amplitude and frequency which is such that the vibrations simulate those vibrations normally produced when the instrument is played.

The device used in this method for instruments having a sound hole may comprise an electric vibration generator attached to a vibration cradle, the vibration cradle being sized and configured for detachable attachment between the body and strings of a stringed musical instrument having a sound hole, the vibration cradle comprising a base sized and configured to be placed in sufficient contact with the sound hole to permit the transfer of vibration generated by the vibration generator into the body of the instrument. In one embodiment, contact with the strings is provided by an appropriate thickness of reversibly compressible material attached to the vibration cradle. Other particular embodiments of the device used in this method are as described above for the apparatus of the invention comprising a vibration cradle.

In a method of this invention, the vibration cradle is placed on the body of the stringed musical instrument under the strings and over at least a portion of the sound hole. One portion of the vibration cradle contacts the strings, holding the apparatus in place on the instrument. The vibration generator does not contact the strings. In a particular embodiment, a large portion of the sound hole is covered by the base of the vibration cradle; in another particular embodiment, the sound hole is nearly completely or completely covered by the base of the vibration cradle.

Generally, supplying electricity to the vibration generator actuates the generation of vibrations, and stopping the supply of electricity causes the generation of vibrations to cease. In a particular embodiment, the supply of electricity to the vibration generator is controlled by a power switch. In another particular embodiment, vibrations are generated for a period of time of at least about 30 minutes. In still another particular embodiment, vibrations are generated for a period of time in the range of about 30 minutes to about 60 minutes. In particular embodiments, the generation of vibrations occurs at least once per day.

The desired power output of the electric vibration generator varies with the stringed musical instrument being seasoned. In particular embodiments, non-limiting values for the power outputs for various musical instruments having a bridge are about 0.5 to about 1 Watt for a violin or a viola; about 1 to about 2.5 W for a cello; and about 4 to about 5 W for a bass. In particular embodiments, non-limiting values for the power outputs for various musical instruments having a sound hole are about 0.5 to about 1 Watt for a guitar; and about 1 to about 2.5 W for a bass guitar. These power output values are a guide, and values outside these ranges are within the scope of this invention.

The Figures represent particular embodiments, and are not intended to be construed as limiting the invention.

Referring now to the Figures, FIG. 1 is a view of an apparatus of the invention attached to the bridge of a stringed musical instrument A. The electric vibration generator 10 is attached to the bridge cradle 12. One of the side walls 16 of the bridge cradle 12 is shown. Flanges 18 and 22 extend away from side wall 16. One of the end members 20 is shown extending from the main body portion 14 (not shown) of the bridge cradle 12. End member 20 is shown sealably connected to a flange 22. Flanges 18 extend between the strings of the instrument. Flanges 18 and 22 do not touch the strings of the instrument.

FIG. 2 is a view of an electric vibration generator 10 and a bridge cradle 12 which are not attached to each other for purposes of illustration; they are shown above a bridge B of a stringed instrument. The bridge cradle 12 has a main body portion 14. One of the side walls 16 of the bridge cradle 12 is shown. Flanges 18 and 22 extend away from side wall 16. One of the end members 20 extending from the main body portion 14 of the bridge cradle 12 is shown sealably connected to a flange 22. An electrical power cord 24 extending from the electric vibration generator 10 and capable of accepting electric current from an external source is shown.

FIG. 3 is a view of an apparatus of the invention shown above a bridge B of a stringed instrument. The electric vibration generator 10 is attached to the bridge cradle 12. On the bridge cradle 12, one of the side walls 16 and flanges 18 and 22 extending away from the side wall 16 are shown. An electrical power cord 24 extending from the electric vibration generator 10 and capable of accepting electric current from an external source is shown.

FIG. 4 is a view of a bridge cradle 12 of an apparatus of the invention. The bridge cradle 12 has a main body portion 14, side walls 16, and flanges 18 and 22 extending away from the side walls 16. The bridge cradle 12 also has end members 20 extending from the main body portion 14. The end members are shown sealably connected to flanges 22.

FIG. 5 is a view of an apparatus of the invention. An electric vibration generator 10 is attached to the vibration cradle 26. An appropriate thickness of reversibly compressible material 30 is attached to the base 28 of the vibration cradle 26. An electrical power cord 24 extending from the electric vibration generator 10 and capable of accepting electric current from an external source is shown.

Figure 6:
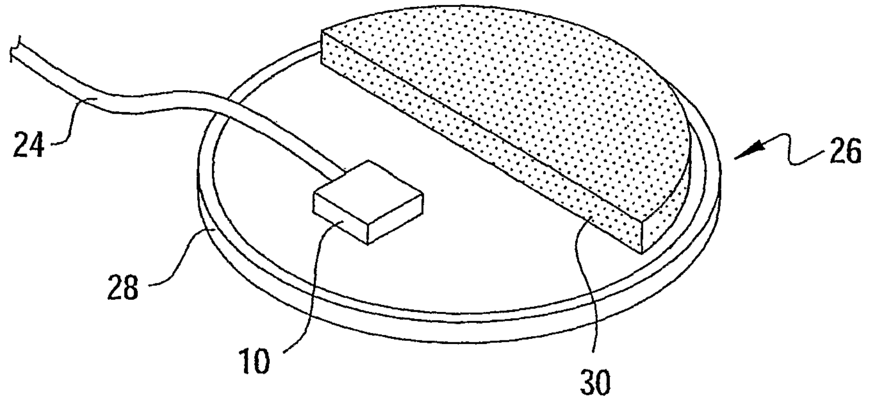
FIG. 6 is a view of an apparatus of the invention attached to a stringed musical instrument having a sound hole.

FIG. 6 is a view of an apparatus of the invention attached to a stringed musical instrument A between the strings C and the body D of the instrument. The electric vibration generator 10 is attached to the vibration cradle 26. The base 28 of the vibration cradle 26 completely covers the sound hole (not shown) of the stringed musical instrument A. An appropriate thickness of reversibly compressible material 30 is attached to the base 28 of the vibration cradle 26. An electrical power cord 24 extending from the electric vibration generator 10 and capable of accepting electric current from an external source is shown.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore, the foregoing description is not intended to limit, and should not be construed as limiting, the invention to the particular exemplifications presented hereinabove.

The invention claimed is:

1. An apparatus comprising an electric vibration generator attached to a bridge cradle that is detachably attachable to a bridge of a stringed musical instrument, the bridge cradle comprising a main body portion that when placed upon the bridge in sufficient contact therewith, permits the transfer of vibration generated by the vibration generator into the instrument through the bridge of the instrument.

2. Apparatus according to claim 1 wherein the bridge cradle further comprises two spaced-apart side walls extending from the main body portion, each of the side walls forming a plurality of spaced-apart, elongate flanges extending from the main body portion, the distance between each set of adjacent flanges being sufficient to accommodate a string of the instrument therein when the cradle is placed upon the bridge, and the distance between the two spaced-apart side walls being sufficient to receive at least a portion of the bridge therebetween.

3. Apparatus according to claim 1 wherein the electric vibration generator is further characterized by at least one of the following characteristics:

it comprises a power switch;

it is configured to accept electric current from an external source.

4. Apparatus according to claim 1 wherein vibrations in the vibration generator are generated by an electromagnet coupled to a permanent magnet on an arm.

5. Apparatus according to claim 2 wherein the electric vibration generator is further characterized by at least one of the following characteristics:

it comprises a power switch;

it is configured to accept electric current from an external source.

6. Apparatus according to claim 2 wherein vibrations in the vibration generator are generated by an electromagnet coupled to a permanent magnet on an arm.

7. Apparatus according to claim 2 wherein the main body portion of the bridge cradle is arched.

8. Apparatus according to claim 2 wherein the flanges have at least one of the following characteristics:

a) they are co-extensive;

b) those in each side wall are equidistantly spaced;

c) those extending from the same side wall are coplanar; and d) those from opposite side walls are directly opposite each other.

9. Apparatus according to claim 8 wherein the flanges have all of the characteristics.

10. Apparatus according to claim 8 wherein the main body portion of the bridge cradle is arched.

11. Apparatus according to claim 9 wherein the main body portion of the bridge cradle has at least one of the following characteristics:

it is arched;

it has end members extending from the main body portion and perpendicular to the side walls, with each end member sealably connecting to a flange on each side wall.

12. A method for seasoning a stringed musical instrument having a bridge, which method comprises i) attaching to the bridge of the instrument a bridge cradle with a vibration generating device fitted to the bridge cradle, and ii) actuating the vibration generating device so as to generate vibrations within the instrument through the bridge cradle to simulate vibration produced within the instrument during normal play.

13. A method according to claim 12 wherein the device is actuated to generate vibrations by a supply of electricity thereto.

14. Apparatus for seasoning a stringed musical instrument having a bridge, the apparatus comprising:

a vibration generator; and a vibration cradle attached to the vibration generator, the vibration cradle attachable in sufficient contact with the bridge of the musical instrument to permit the transfer of vibrations generated by the vibration generator into the body of the instrument.

15. Apparatus according to claim 14 further comprising a reversibly compressible material attaching the device to the vibratory cradle.

16. Apparatus according to claim 14 wherein the electric vibration generator is further characterized by at least one of the following characteristics:

it comprises a power switch;

it is configured to accept electric current from an external source.

17. Apparatus according to claim 14 wherein vibrations in the vibration generator are generated by an electromagnet coupled to a permanent magnet on an arm.

18. A method for seasoning a stringed instrument musical instrument having a bridge, the method comprising the steps of:

placing a vibration cradle in detachable contact with the bridge of the musical instrument;

fitting a vibration generator to the vibration cradle; and transferring vibrations from the vibration generator through the vibration cradle and into the instrument.

19. A method according to claim 18 further comprising the step of attaching the device to the vibratory cradle with a reversibly compressible material.

20. A method according to claim 18 wherein the sound hole is nearly completely or completely covered by the base of the vibration cradle.

21. A method according to claim 18 wherein the device is actuated to generate vibrations by a supply of electricity thereto.

22. Apparatus for seasoning a stringed instrument having a string bridge, the apparatus comprising:

a vibration generator; and a bridge cradle fitted with the vibration generator, the bridge cradle detachably attachable to the bridge of the instrument so that vibrations from the vibration generator are transferred through the bridge cradle into the bridge when the bridge cradle is fitted thereto.

23. A method for seasoning a stringed musical instrument having a bridge, the method comprising the steps of:

providing a vibration generator;

fitting a bridge cradle with the vibration generator;

dimensioning and configuring the bridge cradle for detachable attachment to the bridge of the instrument; and thereafter transferring vibrations from the vibration generator into the bridge.

* * * * *